United States Patent [19]
Lenkoff

[11] Patent Number: 5,234,344
[45] Date of Patent: Aug. 10, 1993

[54] BOOK PACKAGE

[75] Inventor: Claire B. Lenkoff, Jefferson County, Ky.

[73] Assignee: Stry-Lenkoff Company, Louisville, Ky.

[21] Appl. No.: 138,823

[22] Filed: Dec. 28, 1987

[51] Int. Cl.$^5$ .............................. G09B 11/10
[52] U.S. Cl. .............................. 434/84; 283/97; 446/147
[58] Field of Search ............... 434/178, 236, 84, 327, 434/328, 348, 338; 446/147, 149; 283/96, 97

[56] References Cited

U.S. PATENT DOCUMENTS

| | | | |
|---|---|---|---|
| 1,206,795 | 12/1916 | Barrington | 434/84 |
| 1,232,021 | 7/1917 | Gabriel | 283/97 |
| 1,698,739 | 1/1929 | Shulman | 434/84 |
| 2,538,085 | 1/1951 | Cotton | 446/149 |
| 2,857,698 | 10/1958 | Arthur | 434/84 X |
| 2,932,095 | 4/1960 | Keeler | 434/88 |
| 2,946,137 | 8/1959 | Worth et al. | 434/178 |
| 3,600,827 | 8/1971 | Fisher et al. | 434/84 |
| 3,617,325 | 11/1971 | Spokes et al. | 434/328 X |
| 3,745,672 | 7/1973 | Duskin | 434/84 |
| 4,176,473 | 12/1979 | Rae | 446/147 |
| 4,198,445 | 4/1920 | Sokol et al. | 434/328 X |
| 4,212,393 | 7/1980 | Lenkoff | 434/84 |
| 4,416,632 | 11/1983 | Berman | 434/84 |
| 4,514,177 | 4/1985 | Lenkoff | 434/328 |
| 4,524,993 | 6/1985 | Walker-Taylor | 281/46 |
| 4,640,512 | 2/1987 | Burke | 273/157 R |
| 4,714,275 | 12/1987 | Engel et al. | 446/147 |

FOREIGN PATENT DOCUMENTS

| | | | |
|---|---|---|---|
| 2030207 | 12/1971 | Fed. Rep. of Germany | 434/328 |
| 2074943A | 11/1981 | United Kingdom | 434/328 |

*Primary Examiner*—Richard R. Cole
*Attorney, Agent, or Firm*—Polster, Lieder, Woodruff & Lucchesi

[57] ABSTRACT

A book package of sheets including printed materials thereon comprised of printed writing of a connectible series of written expressions and a series of drawing illustrations compatible with the written expressions to allow the sheets to be chronologically and compatibly arranged in illustrated chronological form, a portion of the printed materials being printed in latent form which can be made visible with a marker included in the book package.

1 Claim, 4 Drawing Sheets

BOOK PACKAGE

BACKGROUND OF THE INVENTION

The present invention relates to a book package and more particularly to a novel arrangement of sheets or pages of printed material having printed thereon a series of logically connected information in writing and a series of compatible illustrations, the sheets being ultimately arrangeable in book form, a portion of the printed material being printed in latent form which latent form can be made visible with a marking instrument included with the book package.

It is known to provide a sheet of material, such as paper, with a partially completed illustration printed thereon accompanied by a written paragraph compatible with or relating to the illustration, the reader or user of the sheet being challenged to complete the illustration, attention being directed to long expired U.S. Pat. No. 1,206,795, issued to H. G. J. Barrington on Dec. 5, 1916. Numerous variations of such an arrangement are also well known in the art. For example, in expired U.S. Pat. No. 2,946,137, issued to S. V. Worth, et al, on Jul. 26, 1960, a child's story book is provided which includes pages of printed matter with shiftable adhesive backed pictures to be associated with the printed matter. Further attention is directed to the more recently issued U.S. Pat. No. 4,524,993, issued to Sherry Walker-Taylor on Jun. 25, 1985, which teaches a strip sheet of printed written information with accommodations for an adjacent blank strip sheet to permit compatible illustrations to be made by a reader, and to U.S. Pat. No. 4,640,512, issued to William B. Burke on Feb. 3, 1987, which teaches an interactive book and jigsaw puzzle arrangement.

A number of coloring book arrangements also are well known in the art, such as the long since expired U.S. Pat. No. 1,698,734, issued to I. Schulman on Jan. 15, 1929, which broadly teaches an arrangement for coloring outlined forms compatible with given illustrations, and to more recent U.S. Pat. No. 4,416,632, issued to Mort Berman on Nov. 22, 1983, which broadly teaches an illustrated sheet to be colored by the numbers.

More recent known art also teaches various arrangements for making images visible by physical contact with a marker, including differing colors printed in latent form on sheet material, such as paper, attention being directed to U.K. patent application No. 2,074,943, applied for by Harrison & Sons, invented by S. B. Green and D. E. Pratt, and published in November 1981, and to U.S. Pat. No. 4,212,393, issued to Leon G. Lenkoff on Jul. 15, 1980, both of which publications teach such arrangements.

The present invention recognizing both the educational and game value of unique book packages and the importance of having readers become active participants in the learning process, without loss of interest and without requiring a large number of marking instruments for the readers, particularly young readers, provides a novel book package which can be economically and efficiently manufactured in various forms to provide both a challenging game and an educational skill and logic teaching arrangement which provides for active reader-user participation with minimum safety hazards, marking instruments and concomitant clutter. Moreover, the novel book package of the present invention provides instant response to reader activity to enhance understanding and comprehension of compatible printed information without requiring lengthy periods of time for completion and the concomitant reader disinterest and lack of attention which might otherwise occur. In addition, the present invention provides a novel book package which can be initially arranged in random fashion for subsequent chronological arrangement and book completion by a reader so as to even further develop reading and logic skills in an amusing and instructive manner. Moreover, the present invention provides an engaging and attention holding device to readily confirm the correctness of logic and comprehension skills to a reader.

Various other features of the present invention will become obvious to one skilled in the art upon reading the disclosure set forth herein.

BRIEF SUMMARY OF THE INVENTION

More particularly, the present invention provides a combination book package assembly comprising: a plurality of sheets with printed information thereon, a portion of such printed information being printed in latent form with certain of the sheets having at least one of a logically connectible series of written expressions printed thereon and certain of the sheets having at least one of a series of illustrated drawings printed thereon compatible with the particular written expression with which it is to be associated so that the sheets can be assembled in chronological and compatible book form; marker means capable of activating the portion of printed information printed in latent form to make the same visible; and, means to fasten the plurality of sheets and marker means together into an assembled package, the sheets being arrangeable at a preselected stage for such chronological and compatible assembly.

In addition, the present invention provides for an arrangement wherein the latent information can be a differing color and wherein random assemblage of the plurality of sheets can be intentionally accomplished prior to packaging for subsequent completion and arrangement by a reader along with means for subsequent confirmation of the correctness of such assembly by the reader.

It is to be understood that various changes can be made by one skilled in the art in the several parts of the book assembly described hereinafter without departing from the scope or spirit of the present invention.

BRIEF DESCRIPTION OF THE DRAWINGS

Referring to the drawings which disclose one advantageous embodiment of the present invention and a further modification thereof.

DETAILED DESCRIPTION OF THE INVENTION

Figure 1:
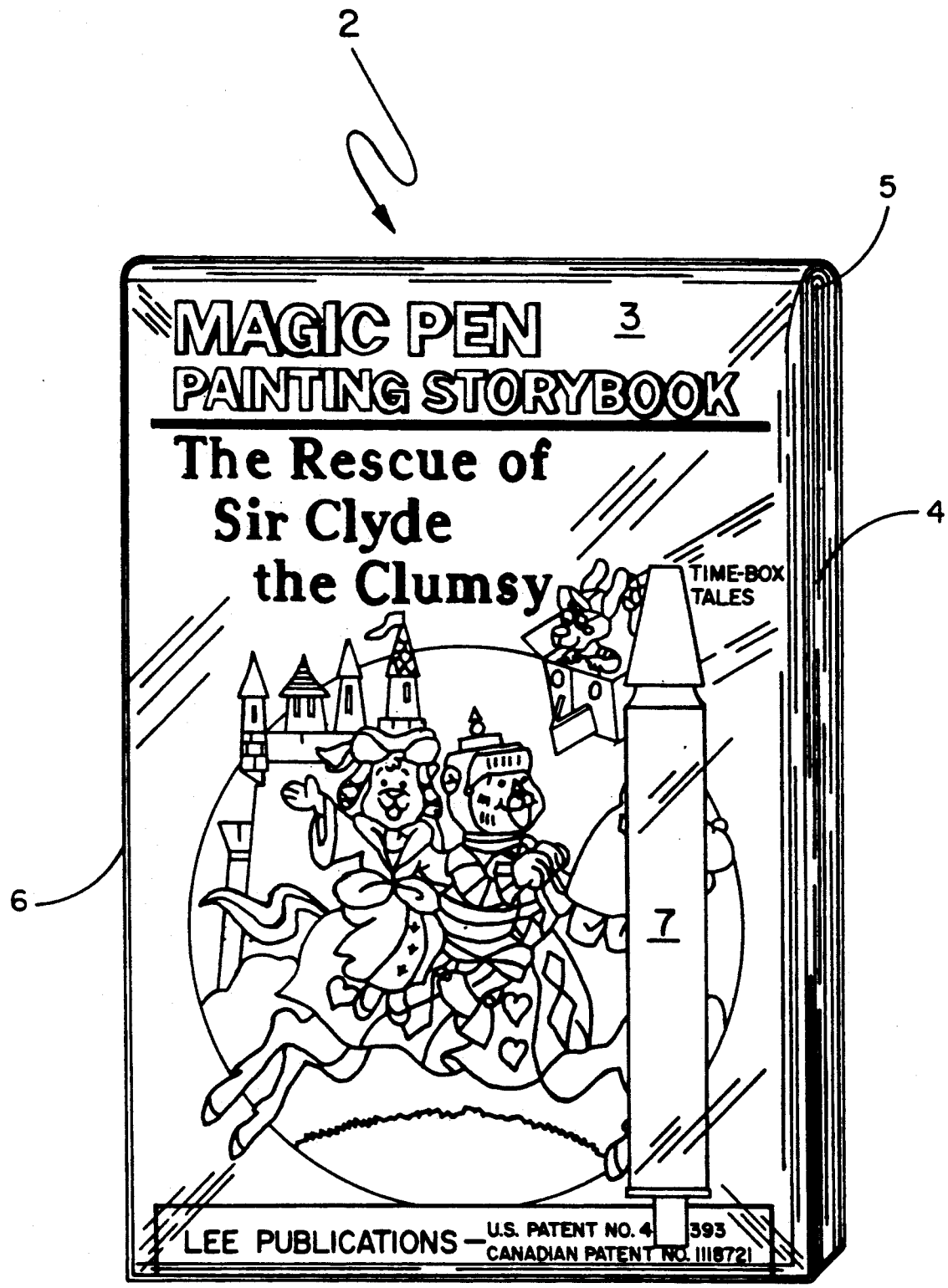
FIG. 1 is an overall perspective assembly view of the several sheets of the novel book package, including one type of marking instrument which can be used and a transparent shrink type wrapper fastening the entire package together.

Referring to FIG. 1 of the drawings, a novel book package 2 is disclosed broadly as being in assembled book form 3 with the plurality of sheets 4 being bound along the top 5 in chronological story-book fashion, in accordance with one form of the present invention described more fully hereinafter. A suitable wrapper 6, which can be in the form of a transparent, plastic, shrink-type wrapper as is known in the packaging art, serves to snugly surround assembled book 3 and marking instrument 7 to fasten the assembled book package 2 together.

Figure 2:
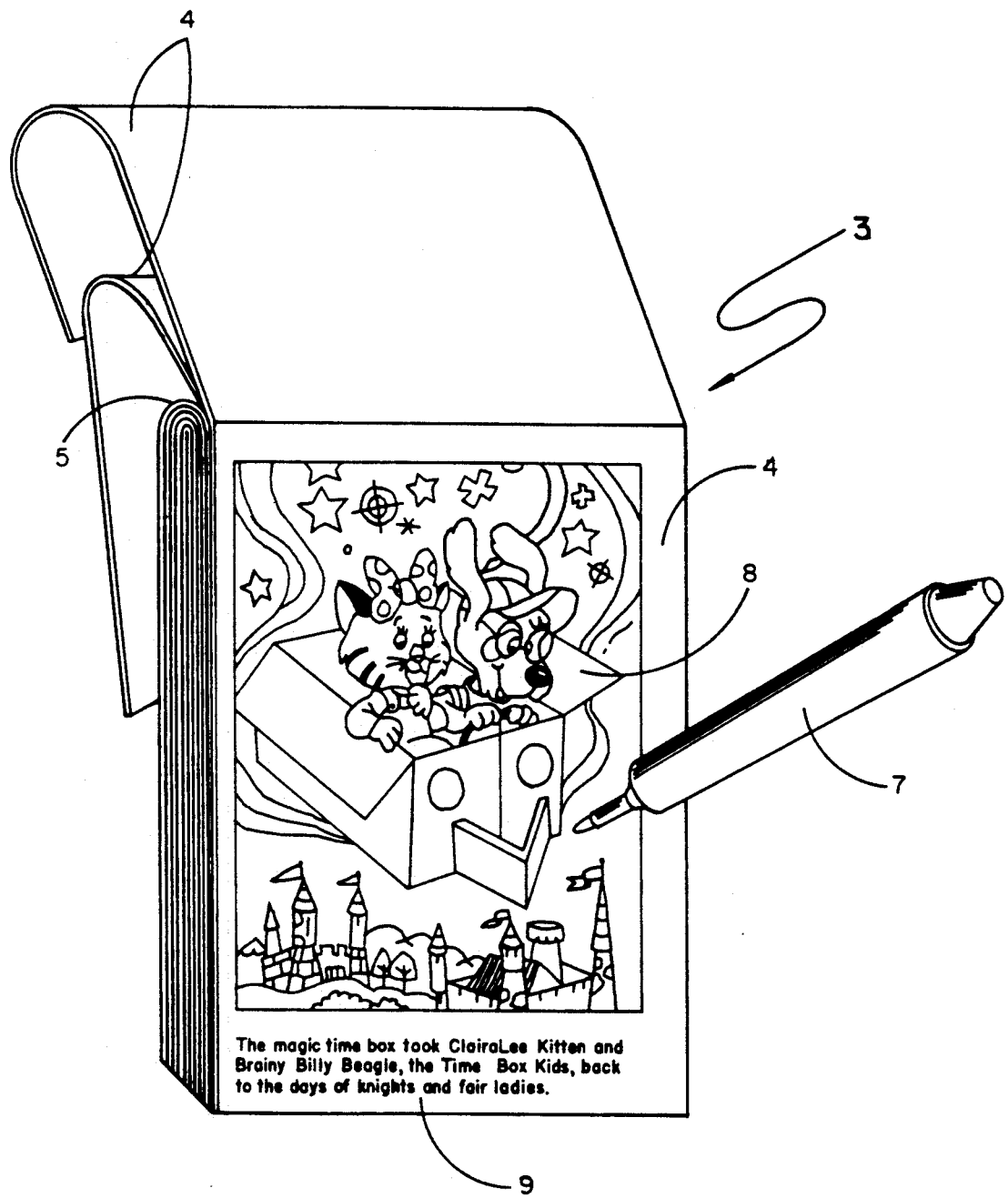
FIG. 2 is a different perspective view of the novel invention in book form with the wrapper removed and the marker positioned to activate latent information, such as differing colors, in the illustration on one sheet of the book.

Referring to FIG. 2 of the drawings, a sheet 4 of assembled book 3 which has been assembled as a story book is disclosed including printed information thereon in the form of an illustrated cartoon drawing outline 8, the outline serving to illustrate one of a connectible series of expressions compatible with the written paragraph 9 with which it is associated and which, in this instance, is printed in the form of a written expression in the English language immediately below. It is to be understood that subsequent sheets or pages of assembled book 3 include other printed illustrations accompanied by compatible written expressions thereon, the sheets or pages being arranged in successive chronological series to tell a story to the reader. In this regard, attention is directed to FIG. 3 of the drawings which discloses a different illustration 12 and a compatible but different written expression 13 describing a happening of the story chronologically in series with illustration 8 and written expression 9 of the happening as set forth in the sheet of FIG. 2. It further is to be understood that the present invention is not to be considered as limited to the printing of one illustrated drawing and one compatible written expression on a single sheet of the book nor to the printing of a compatible written expression and drawing on the same sheet. Moreover, the present invention contemplates usage of other languages besides English and other forms of drawing illustrations. For example, it might be desirable to provide books for teaching music or language arranged in accordance with the teachings of the present invention.

Figure 3:
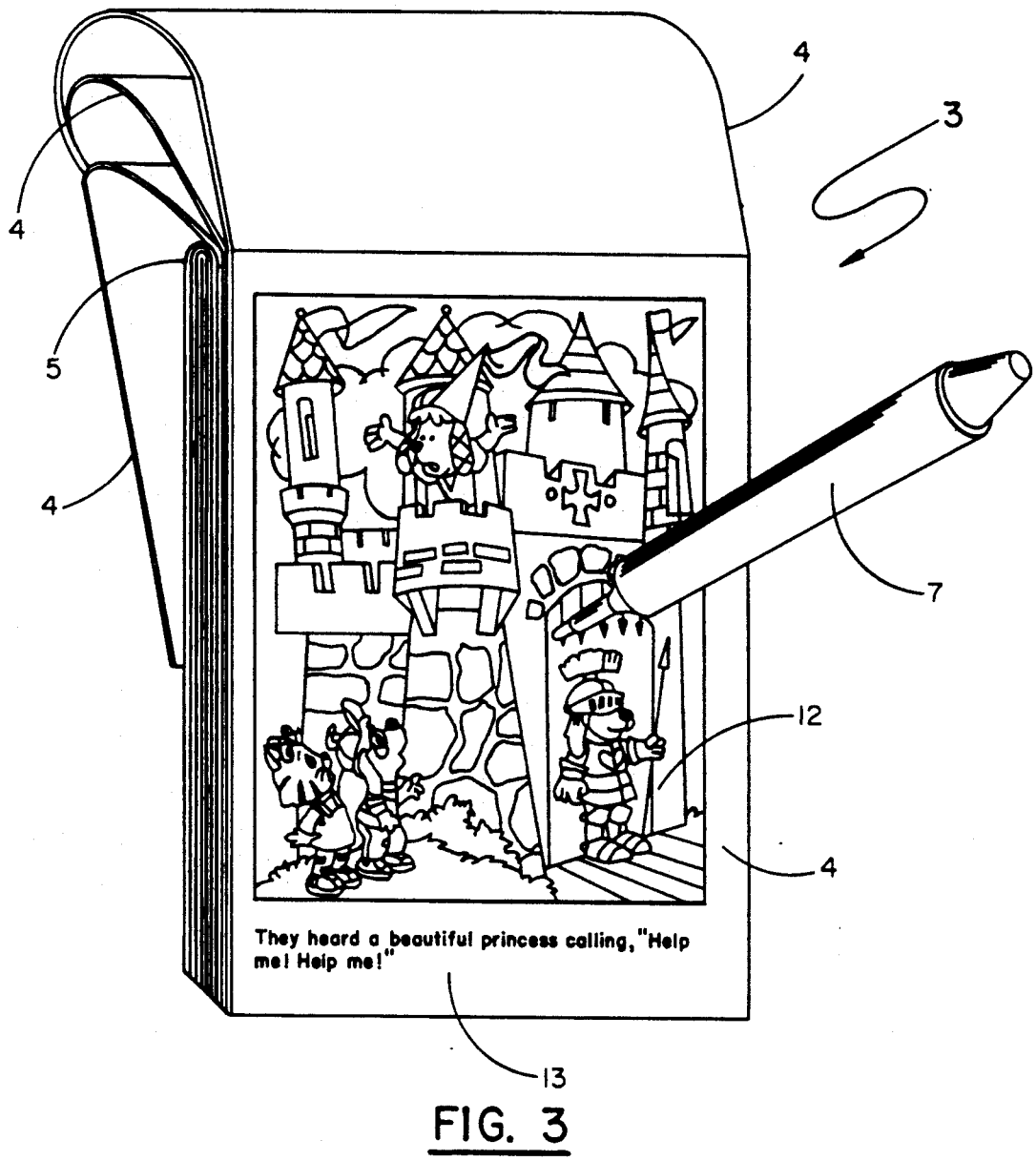
FIG. 3 is a perspective view similar to that of FIG. 2 with a completed sheet of the book turned and the marker positioned to activate latent information on a logically connected adjacent sheet of the book.

As can be seen in FIGS. 1–3 of the drawings, marking instrument 7 serves to activate the portion of printed information on a sheet which has been printed in latent form to make such information visible. In this regard, a latent image producing technique, such as is disclosed in detail in U.S. Pat. No. 4,212,393, advantageously can be employed, although other latent image producing techniques capable of yielding a comparatively prompt response upon sheet contact also can be employed. Pursuant to the teachings of U.S. Pat. No. 4,212,393, the visible outlines of the illustrations such as disclosed in FIGS. 2 and 3 can be printed therein with a water-insoluble ink of a uniform color and a variety of water-soluble coloring materials of different colors located at selected predetermined portions within the outlines. The water-soluble coloring materials are thoroughly mixed with the water-insoluble ink to such an extent that the water-soluble colors are latent within the water-insoluble uniformly colored ink.

Figure 4:
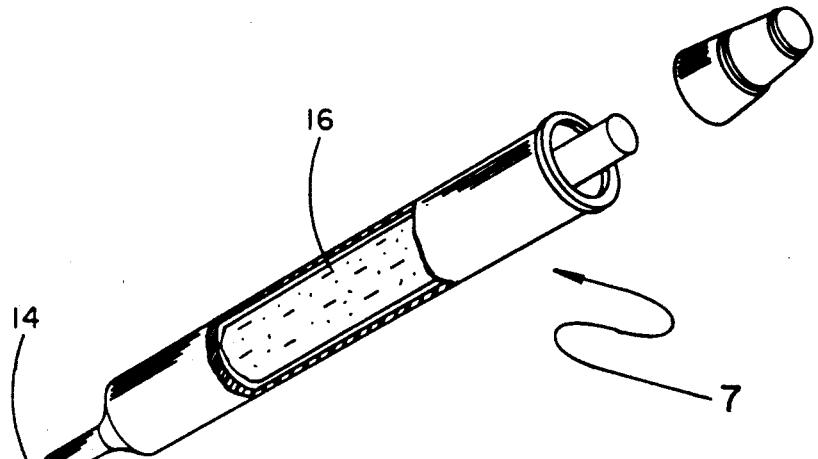
FIG. 4 is a partially broken away isometric view, disclosing the inner parts of the marking instrument of FIGS. 1–3; and, FIG. 5 is a plan view of a number of sheets of the inventive book assembly, disclosing these sheets positioned to be fastened together in random fashion in the assembled package and including latent confirmation indicia set forth in dotted line form.

The marker 7 which is used to activate the latent color images and which is disclosed more fully in FIG. 4 of the drawings includes a single felt tip 14 or a tip of other porous material positioned at one end of and communicating with tubular chamber 16 in the hollowed portion of marker 7, the other end of chamber 16 being closed. Chamber 16 can be provided with a suitable liquid selected from a group consisting of water and a solution of water with a water evaporation inhibitor. When felt tip 14 is brought into contact with the outline of a sheet 4, it meters out the liquid in small amounts to be deposited within the outline and thus activate the water-soluble coloring materials therein.

Figure 5:
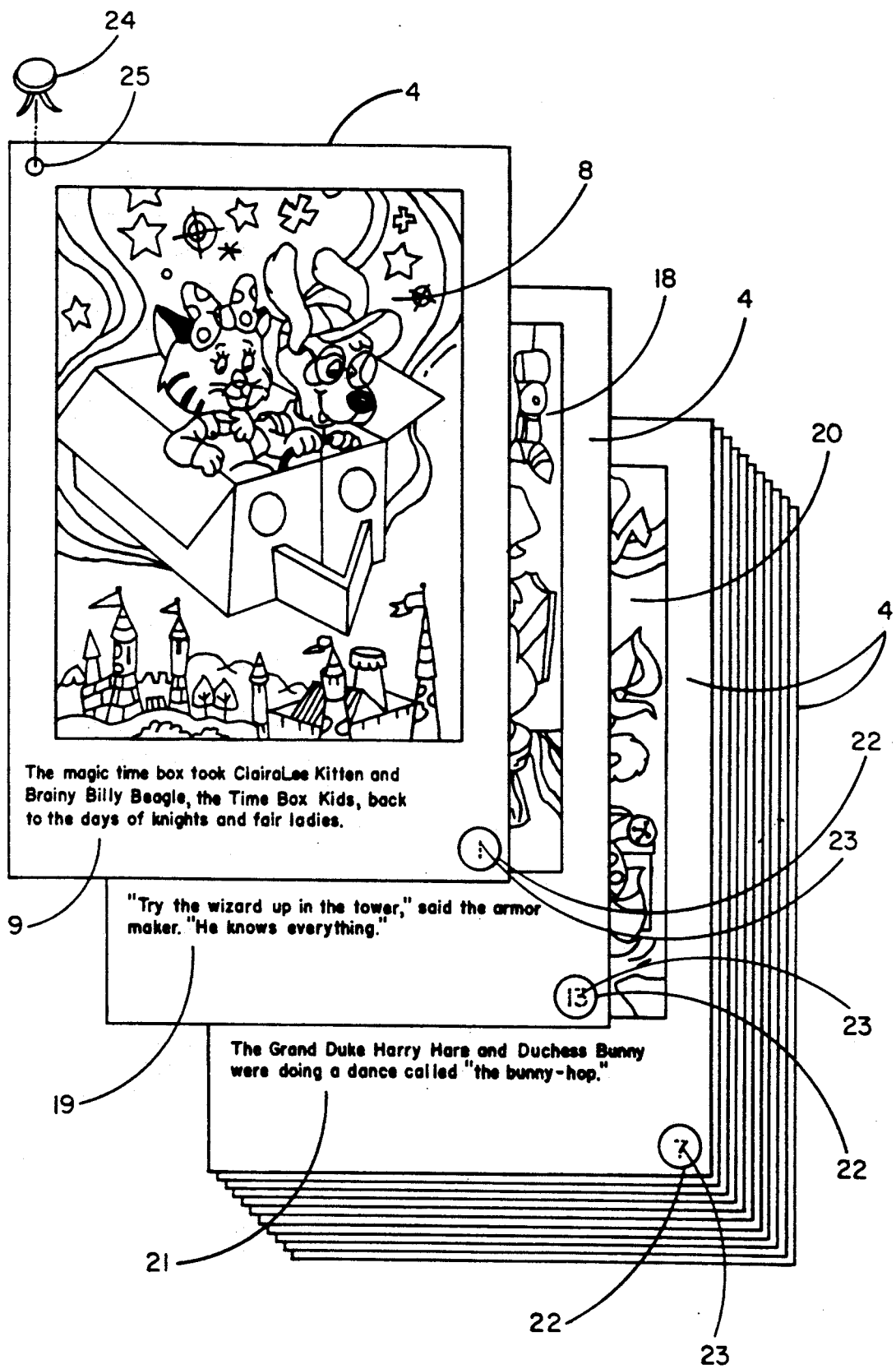

According to still another feature of the present invention, the separate sheets 4 of a book package can be assembled in random fashion in the assembled package, FIG. 5 of the drawings disclosing portions of sheets 4 with illustrations 18 and 20 and their respective compatible written happening 19 and 21 assembled in random non-chronological fashion immediately after the top sheet 4, which includes aforedescribed illustration 8 and written happening 9. With the sheets 4 preselectively arranged in any one of a number of possible random fashion arrangements, they can be assembled together with a suitable wrapper 6 such as previously described or even a suitably sized box, providing a further challenge to the reader to assemble the sheets in proper story-telling chronological order, either before or after developing the latent images on each sheet. In this regard, it is to be noted that each sheet 4 can be provided with a latent indicia to serve to confirm chronological book assemblage to the reader when such indicia is rendered visible. In this regard and as can be seen in FIG. 5, each sheet can be further provided with a suitable outline, such as visible circle 22, positioned at a suitable location on the sheet, such as a corner, the outline 22 containing an invisible numeral or a letter 23 shown in broken line form to confirm chronological assembly by the reader. If desired, sheets 4 can be perforated at another corner, as at 25, to receive fastening clip 24 which can be included with book package 2.

In still a further feature of the present invention, each written expression instead of being a happening of a story, can itself be a letter of the alphabet series or a numeral of a number series, each alphabet letter or numeral being provided with a separate compatible illustration demonstrating such letter or numeral to the teaching delight of a younger reader. The series of letters or numerals with compatible illustrations can be preselectively arranged in book form or in random arrangement, all as above described. Further, in accordance with the present invention, it also would be possible to combine the written expression and compatible drawing in a mutually inclusive form on a sheet. For example, the alphabet letter "C" could be outlined on a sheet with latent images of different items included therein, such as a cat, a cow and a car.

The invention claimed is:

1. A combination book package assembly comprising: a plurality of sheets with printed information thereon, a portion of said printed information being printed in latent form within a visible outline, with certain of said sheets having at least one of a logically and orderly connectible series of written expressions printed thereon and certain of said sheets having at least one of a logically and orderly connectible series of illustrated drawings printed thereon compatible with the particular written expression with which it is to be logically associated so that said sheets can be assembled in logically successive page order with continuity of thougth in compatible book form;

marker means capable of solely activating said portion of printed information printed in latent form to make the same visible;

said information printed in latent form within a visible outline being of coloring material differing from the initial color of said sheet located at predetermined portions within the outline, said coloring materials being activatable when solely contacted with said marker physically independent of said other sheets to provide a completed sheet; and means to fasten said plurality of sheets and marker means together into an assembled book package, the sheets being arrangeable at a preselected stage for such logically successive page order with continuity of thought in compatible assembly, said plurality of sheets being fastened together in random fashion in said book package to be arrangeable after package opening in logically successive page order with continuity of thought in compatible assembly, said portion of said printed information printed in latent form including latent indicia serving to confirm logically successive page order with continuity of thought in compatible assemblage when rendered visible.

* * * * *